United States Patent [19]
Saito

[11] Patent Number: 5,263,625
[45] Date of Patent: Nov. 23, 1993

[54] ULTRASONIC TAPE GUIDE APPARATUS

[75] Inventor: Etsuro Saito, Kanagawa, Japan

[73] Assignee: Sony Corporation, Tokyo, Japan

[21] Appl. No.: 841,045

[22] Filed: Feb. 25, 1992

[30] Foreign Application Priority Data

Mar. 8, 1991 [JP] Japan .................................. 3-043509

[51] Int. Cl.[5] .............................................. B65H 27/00
[52] U.S. Cl. .................................... 226/196; 226/194; 242/76
[58] Field of Search ................. 226/190, 194, 196, 10; 242/76

[56] References Cited

U.S. PATENT DOCUMENTS

| | | | |
|---|---|---|---|
| 4,403,720 | 9/1983 | Grant | 226/196 X |
| 4,427,166 | 1/1984 | Oishi et al. | 226/196 X |
| 4,440,485 | 4/1984 | Maldonado et al. | 226/196 X |
| 5,152,444 | 10/1992 | Saito | 242/76 X |

Primary Examiner—Daniel P. Stodola
Assistant Examiner—Paul T. Bowen
Attorney, Agent, or Firm—William S. Frommer; Alvin Sinderbrand

[57] ABSTRACT

A tape guide apparatus having a cylindrical guide member for guiding a tape, an ultrasonic vibrator secured to the guide member for vibrating the guide member in a standing wave fashion and a supporting member for supporting the guide member is provided. This tape guide apparatus is comprised of a shaft whose diameter is enough to be inserted into the inside of the guide member, a ring-shaped protrusion provided on the shaft independently of the shaft and for supporting the guide member at position corresponding to a node portion of a standing wave vibration of the guide member, and a position restricting member provided on the shaft and for restricting a position of at least one end of the guide member.

8 Claims, 7 Drawing Sheets

ULTRASONIC TAPE GUIDE APPARATUS

BACKGROUND OF THE INVENTION

1. Field of the Invention

The present invention generally relates to tape guide apparatus and, more particularly, is directed to a ultrasonic tape guide apparatus for use with a video tape recorder or the like, for example.

2. Description of the Prior Art

Roughly classified, rotary type and stationary type tape guide apparatus are known as tape guide apparatus for use in video tape recorders or the like.

The rotary type tape guide apparatus has a feature such that, when a tape is transported, the rotary type tape guide apparatus has a little resistance against the transport of the tape. However, the rotary type tape guide apparatus cannot avoid disadvantages such that the tape is not transported regularly when a bearing used therein is not rotated regularly and that the tape is affected by a force applied thereto from a roller in the width direction, when the tape transport direction is not perpendicular to the rotating direction of the rotating roller. Particularly in the latter disadvantage, if the tape is moved in the width direction, then the tape edge is frequently damaged. For this reason, in case the rotary type tape guide apparatus is employed, assembly parts must be produced at very high accuracy and also the parts must be assembled at very high accuracy, which unavoidably brings various difficulties in the manufacturing process of the rotary type tape guide apparatus.

Although the stationary type tape guide apparatus can assure the stable transport of the tape, it has a disadvantage such that the tape must be transported with a large resistance.

For this reason, it is desired that a tape guide apparatus is of the stationary type which enables a tape to run with a little resistance. An air tape guide is proposed as an example of the desired tape guide apparatus. According to this air type of tape guide apparatus, air is blown from small apertures bored through the surface of the guide member to float the tape so that the tape is transported with a reduced resistance. However, even this air type of tape guide apparatus has new problems, such as when a compressor is needed as an air supply source or the like.

In order to remove the aforesaid shortcomings and to solve the aforesaid problem, the assignee of the present application has previously proposed a ultrasonic tape guide apparatus which makes effective use of ultrasonic waves as described in Japanese Patent Application No. 2-103627. This ultrasonic tape guide apparatus can reduce a resistance against the tape while the advantage such as the stable tape transport provided by the stationary type tape guide apparatus can be maintained.

FIG. 1 is a cross-sectional view illustrative of such prior-art ultrasonic tape guide apparatus that is generally represented by reference numeral 1 in FIG. 1.

In the tape guide apparatus 1, as shown in FIG. 1, a main shaft 5 is implanted on a base 18, and a guide member 2 having a ultrasonic vibrator 3 secured thereto is supported by a cylindrical supporting shaft 7 having a supporting protrusion 7b. Lower and upper flanges 9 and 10 are disposed so as to come in contact with lower and upper end portions of the supporting shaft 7, thereby guiding the edge portion of a tape wrapped around a guide member 2.

The main shaft 5 is constructed so as to be inserted into the lower and upper flanges 9 and 10 and the supporting shaft 7. A height adjusting screw 6 is engaged with the inner circumferential part of the upper end portion of the supporting shaft 7 and is also engaged with a screw 23 formed on the upper end portion of the main shaft 5. Thus, the main shaft 5, the supporting shaft 7, the height adjusting screw 6, the screw 23 and the guide member 2 constitute a supporting member 4.

The upper flange 10 is secured to the upper portion of a mount member 8 by a mount screw 15 and the lower flange 9 is secured to the lower portion of the mount member 8 by fixing pins 22 and 24. The mount member 8 has an element housing portion 8a which is an opening of a rectangular solid configuration having side walls 8b, 8b on the respective sides thereof, as shown in FIG. 2. Stopper engaging apertures 8c, 8c are formed on the two side walls 8b, 8b, respectively.

Each of the stopper engaging apertures 8c is engaged with an engaging protrusion 39a of a disk-shaped stopper 39 made of a rubber. The ultrasonic vibrator 3 is sandwiched by the stoppers 39, thereby hindering the rotation of the guide member 2.

The mount member 8 keeps the lower and upper flanges 9 and 10 in parallel to each other such that the distance between the upper and lower flanges 9 and 10 becomes larger than the length of the guide member 2 by about 0.1 mm.

Referring back to FIG. 1, the lower flange 9 is pushed upwardly by a spring-biasing force of a coil spring 35 disposed in the outer circumference of the main shaft 5 between the lower flange 9 and the base 18. The base 18 has a pin insertion aperture 20 into which is inserted the fixed pin 22 implanted on the lower surface of the lower flange 9.

According to the above-mentioned arrangement, when the height adjusting screw 6 is rotated, then the height of the guide member 2 can be adjusted by a spring-biasing force of the coil spring 35 and against the spring-biasing force of the coil spring 35.

FIG. 3 is a graph graphing the vibrated state of a standing wave generated in the guide member 2 by the application of AC voltage to the ultrasonic vibrator 3 under the condition such that the vibrated state is expanded taken along the line X—X. As shown in FIG. 3, a dashed line N—N represents a node portion of the vibration and the vibration is zero on this line N—N. Assuming that n represents a distance from the end face of the guide member 2 to the node position, then the position of the supporting protrusion 7b in the axial direction is determined as n from the end face of the guide member 2 as shown in FIG. 1.

As clear from the above description, according to the example of the prior art, the mounting member 8 must be produced at high accuracy in order to keep the lower and upper flanges 9 and 10 in parallel and also in order to keep the spacing between the lower and upper flanges 9 and 10 larger than the length of the guide member 2 by about 0.1 mm. Further, as shown in FIG. 2, the lower and upper flanges 9 and 10 are not circular, which makes the manufacturing process of the lower and upper flanges 9 and 10 very difficult. Accordingly, the tape guide apparatus cannot be made compact in size and also cannot be made inexpensive.

OBJECTS AND SUMMARY OF THE INVENTION

Therefore, it is an object of the present invention to provide an improved ultrasonic tape guide apparatus in which the aforesaid shortcomings and disadvantages of the prior art can be eliminated.

More specifically, it is an object of the present invention to provide a ultrasonic tape guide apparatus which can be made inexpensive.

Another object of the present invention is to provide a ultrasonic tape guide apparatus which can be simplified in structure.

A further object of the present invention is to provide a ultrasonic tape guide apparatus by which a tape can be transported highly stably.

An additional object of the present invention is to provide a ultrasonic tape guide apparatus which is suitably applied to a video tape recorder.

As a first aspect of the present invention, a tape guide apparatus having a cylindrical guide member for guiding a tape, a ultrasonic vibrator secured to the guide member for vibrating the guide member in a standing wave fashion and a supporting member for supporting the guide member is comprised of a shaft whose diameter is enough to be inserted into the inside of the guide member, a ring-shaped member provided on the shaft independently of the shaft and for supporting the guide member at position corresponding to a node portion of a standing wave vibration of the guide member, and a position restricting member provided on the shaft and for restricting a position of at least one end of the guide member.

The above and other objects, features, and advantages of the present invention will become apparent from the following detailed description of illustrative embodiments thereof to be read in conjunction with the accompanying drawings.

DETAILED DESCRIPTION OF THE PREFERRED EMBODIMENTS

The present invention will hereinafter be described in detail with reference to the accompanying drawings.

Figure 4:
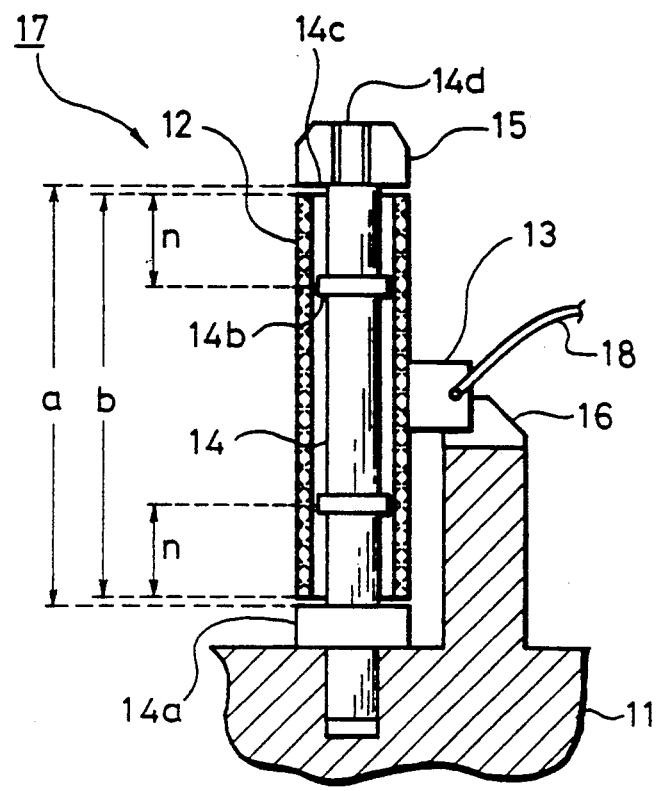
FIG. 4 is a cross-sectional view illustrating a first embodiment of a tape guide apparatus according to the present invention.

FIG. 4 shows a cross-sectional view of a first embodiment of a tape guide apparatus according to the present invention.

Figure 5:
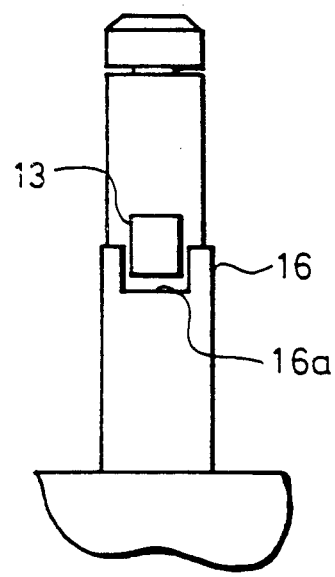
FIG. 5 is a side view illustrative of the first embodiment of the tape guide apparatus according to the present invention, and to which references will be made in explaining a main portion of the present invention.

In FIG. 4, reference numeral 17 generally depicts a tape guide apparatus according to a first embodiment of the present invention, 11 a base, 14 a main shaft mounted on the base 11, 12 a guide member made of a ceramics material, 13 a ultrasonic vibrator attached to the guide member 12, 14a boss provided on the main shaft 14, 14b supporting protrusions provided on two positions of the main shaft 14, 15 a locking nut screwed into a screw portion 14d formed on the end portion of the main shaft 14 and 16 a rotation preventing member attached to the base 11. This rotation preventing member 16 is provided to sandwich the ultrasonic vibrator 13 at its concave portion 16a as shown in FIG. 5.

A relation between a distance a from the upper end of the boss 14a of the main shaft 14 to its shoulder portion 14c and a length b of the guide member 12 is expressed $a = b + 0.1$ mm. The locking nut 15 is locked at the shoulder portion 14c so that when the guide member 12 is assembled into the space between the upper end of the boss 14a and the lower end of the locking nut 15, a spacing of approximately 0.1 mm is provided.

Figure 6:
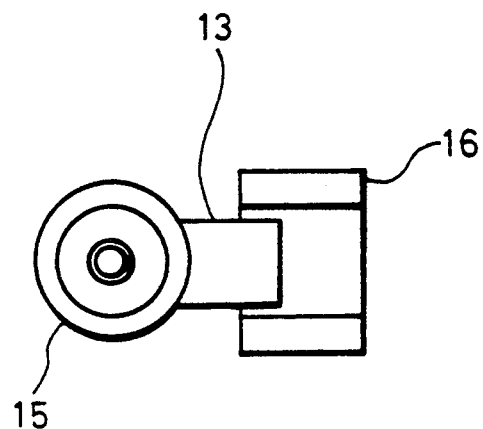
FIG. 6 is a top view illustrative of the main portion of the tape guide apparatus according to the first embodiment of the present invention.

A very small spacing is provided between the inner surface of the guide member 12 and the outer surface of the main shaft 14, whereby the guide member 12 can be freely rotated around the main shaft 14. In this case, as shown in FIGS. 5 and 6, since the ultrasonic vibrator 13 is sandwiched by the concave portion 16a of the rotation preventing member 16, the guide member 12 is hindered from being rotated around the main shaft 14.

Figure 7:
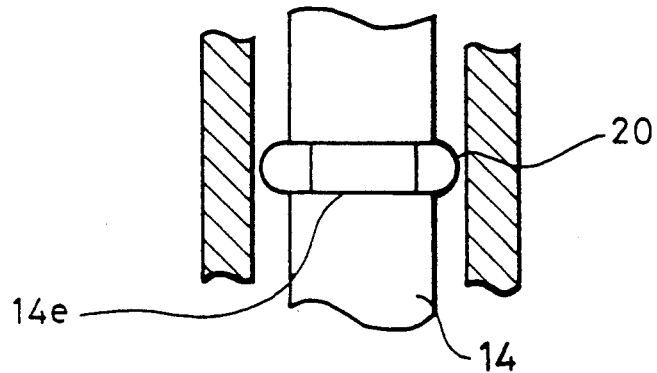
FIG. 7 is a cross-sectional view illustrative of a part of the tape guide apparatus according to the first embodiment of the present invention.
Figure 8:
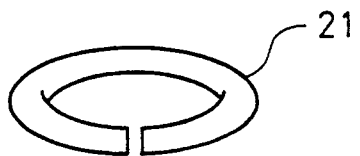
FIG. 8 is a schematic diagram showing a resin ring having a recess, and to which references will be made in explaining the tape guide apparatus according to the first embodiment of the present invention.

Further, according to this embodiment, as shown in FIG. 7, a supporting protrusion 20 made of resin is embedded into a groove 14e formed on the main shaft 14. In the assembly process, the resin protrusion 20 is molded into the groove 14e by a so-called outsert method. Alternatively, as shown in FIG. 8, a resin ring 21 having a cut-out is inserted into the main shaft 14 or the resin ring is expanded and inserted into the main shaft 14 by a pressure. The ring may contact at its flat or curved portion with the guide member 12.

In the tape guide apparatus thus arranged, when an AC voltage of a resonance frequency of the guide member 12 is applied to the ultrasonic vibrator 13, a standing wave is generated in the guide member 12. As a consequence, when the tape transport is guided by the tape guide apparatus 17, a friction coefficient is reduced to a small fraction of the friction coefficient provided when the AC voltage is not applied to the ultrasonic vibrator 13.

Figure 3:
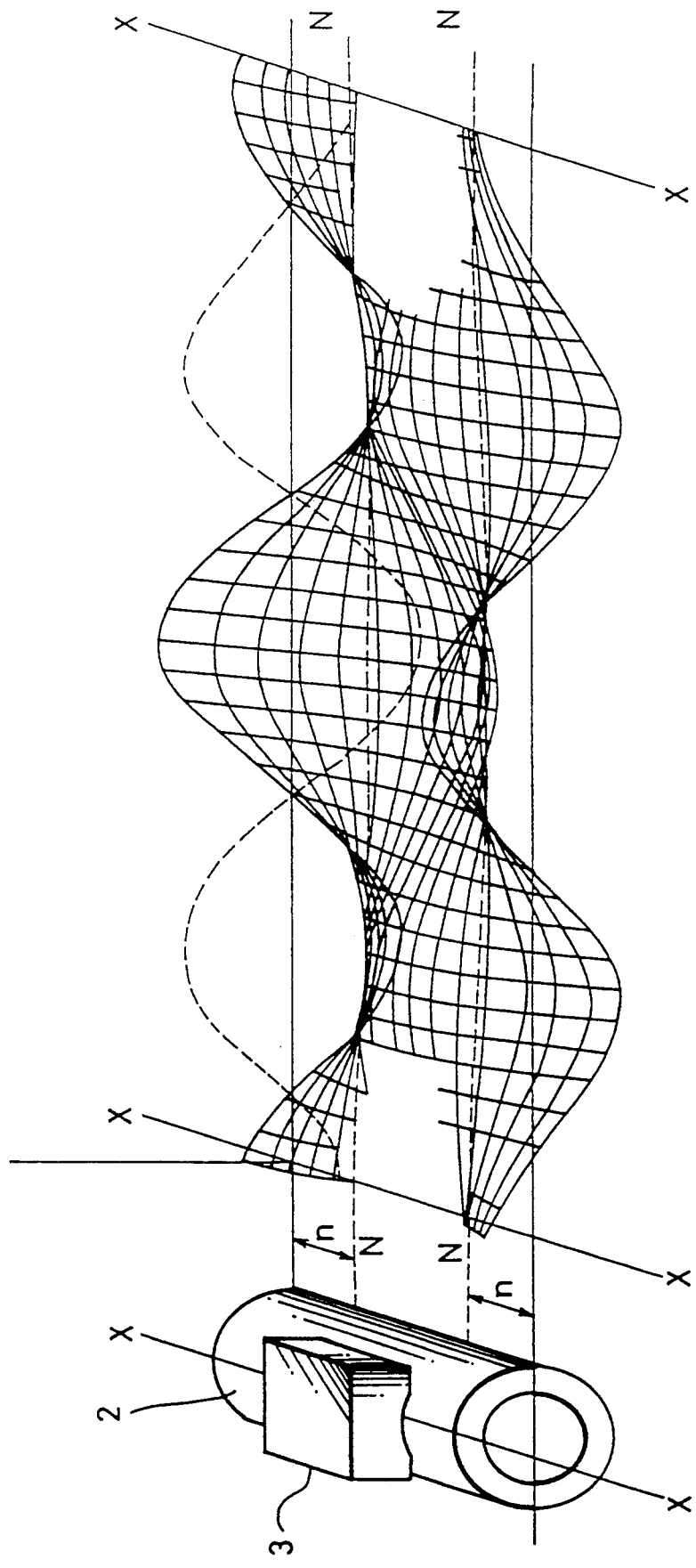
FIG. 3 is a graph used to explain the conventional tape guide apparatus and tape guide apparatus according to the present invention.

The state of the standing wave generated on the guide member 12 is represented as shown in FIG. 3, and the position of the supporting protrusion 14b in this embodiment is determined as the position distant from the end face of the guide member 12 by substantially the distance n.

Figure 1:
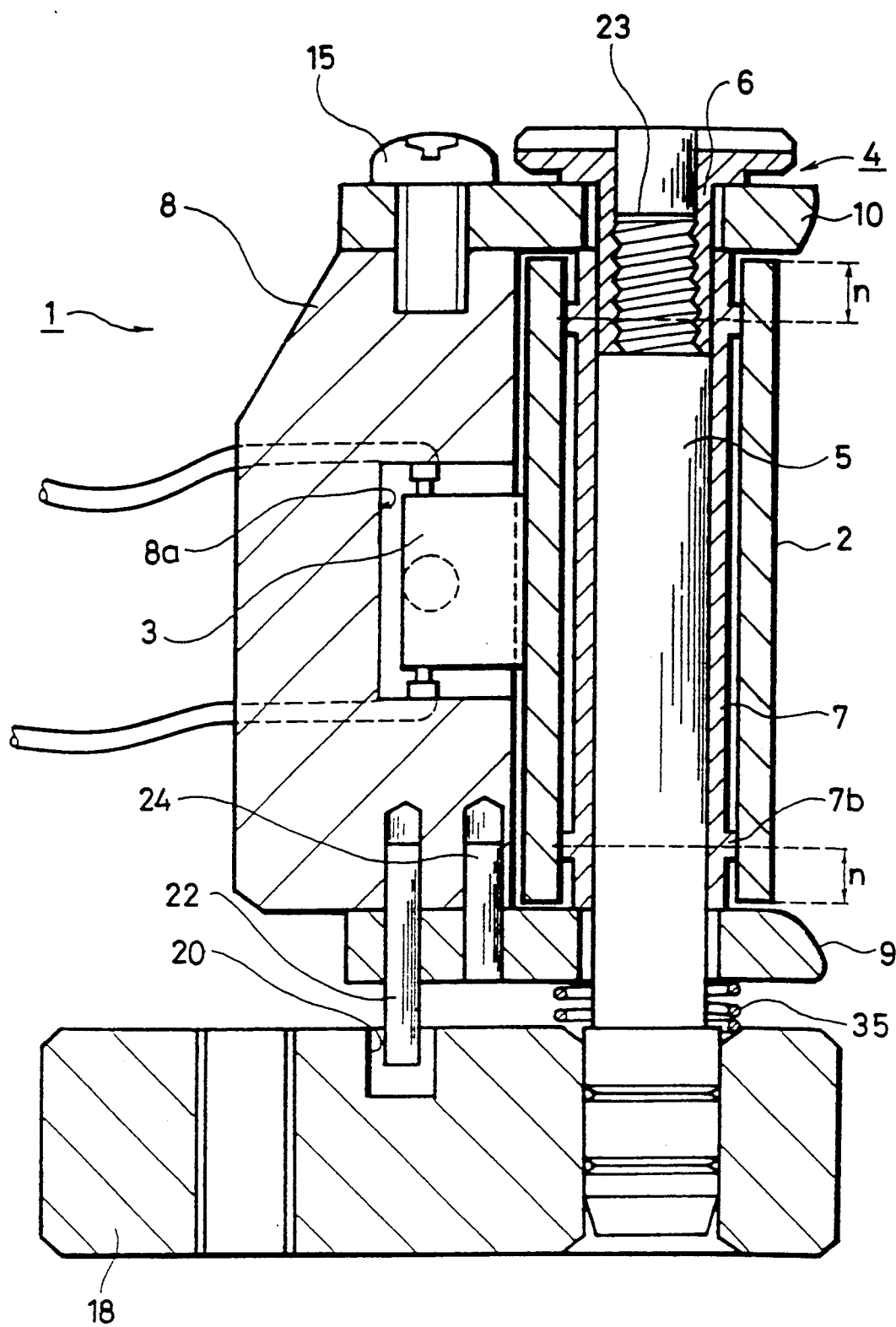
FIG. 1 is a cross-sectional view illustrative of an example of a tape guide apparatus according to the prior art.
Figure 2:
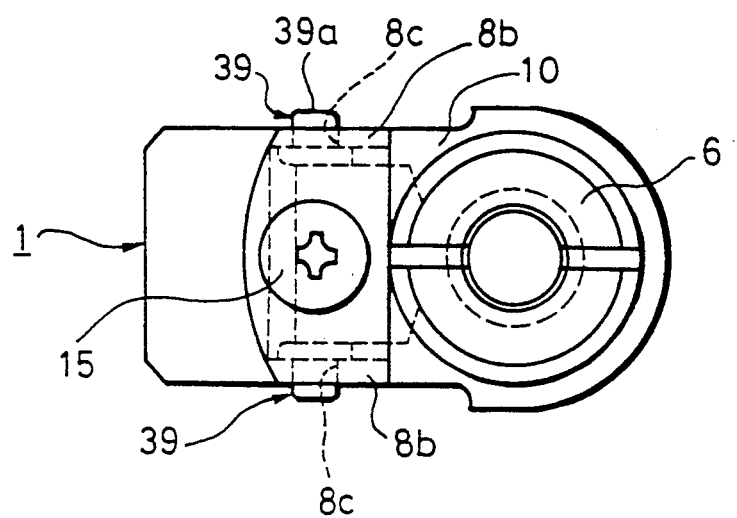
FIG. 2 is a plan view illustrative of the example of the conventional tape guide apparatus shown in FIG. 1.

As clear from the aforesaid embodiment, without using the mount member 8 of high accuracy unlike the prior art shown in FIG. 1, the rotation preventing member 16 directly attached to the base 11 functions as the rotation preventing member of the guide member 12 instead of the mount member 8, the supporting shaft 7 (see FIG. 1) is removed and the supporting protrusion 20 is provided on the supporting shaft 14 instead of the supporting protrusion 7b (see FIG. 1), thereby the tape guide apparatus being made compact in size and inexpensive.

In the tape guide apparatus according to the first embodiment of the present invention, since the supporting member is comprised of the shaft longer than the guide member and which is enough in outer diameter to be inserted into the inside of the guide member, the supporting protrusion provided on the shaft and supporting the guide member at the position corresponding to the node portion of the standing wave vibration of the guide member and the position restricting portion provided on the shaft and for restricting the position of at least one end of the guide member, the assembly parts are reduced and the mechanism is simplified, whereby the tape guide apparatus can be made compact in size and inexpensive.

The tape guide apparatus according to a second embodiment of the present invention will be fully described below.

Figure 9:
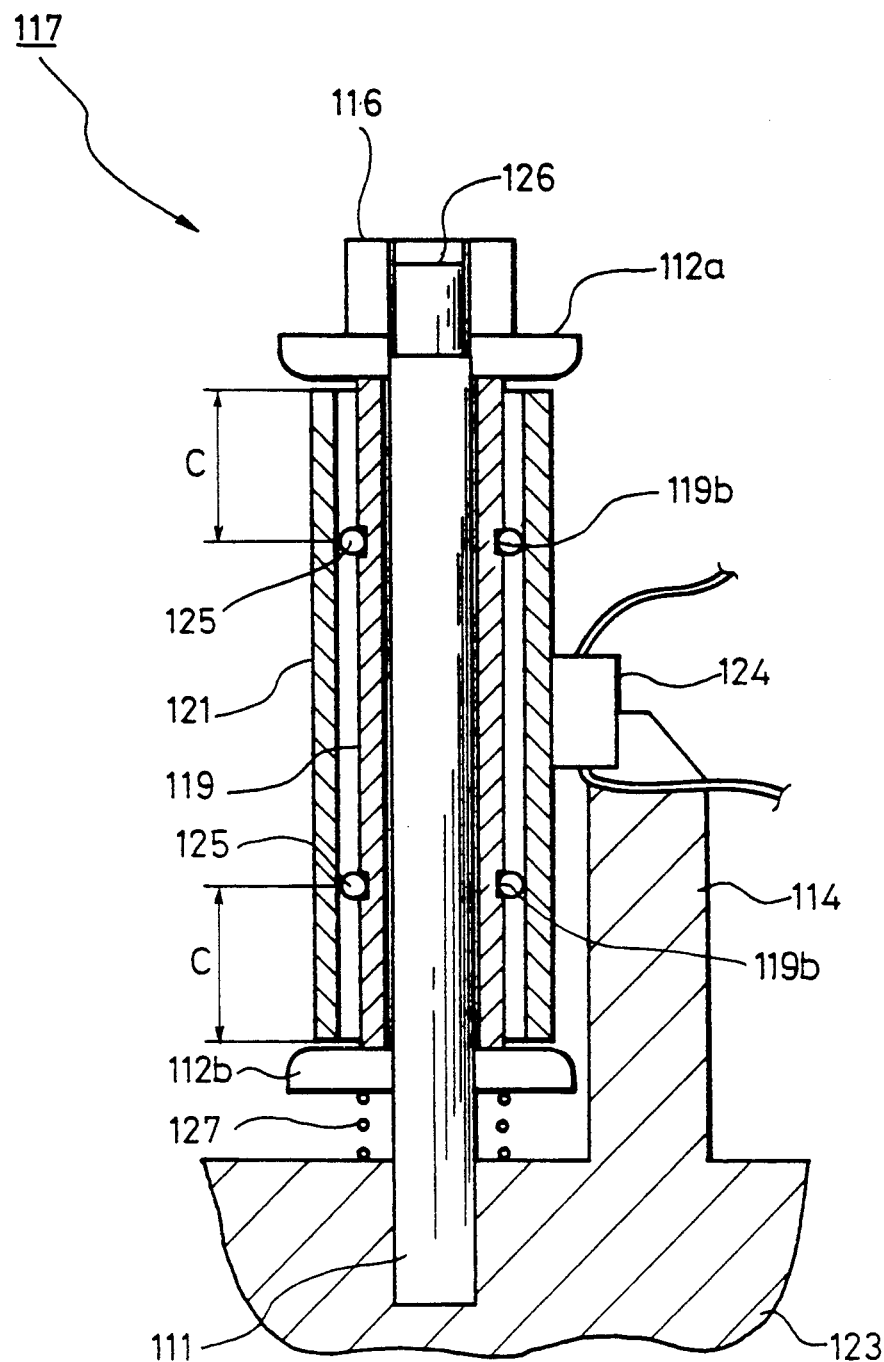
FIG. 9 is a cross-sectional view illustrative of the tape guide apparatus according to a second embodiment of the present invention.

FIG. 9 shows a cross-sectional view of the second embodiment of the tape guide apparatus according to the present invention.

In FIG. 9, reference numeral 123 designates a base, and a main shaft 111 having a screw portion 126 formed at its top portion is implanted on the base 123. A coil spring 127 is engaged into the main shaft 111 and a lower flange 112b is engaged into the main shaft 111 to be located on the coil spring 127.

Reference numeral 119 depicts a cylindrical supporting shaft for the main shaft 111 and concave portions 119 are formed on the supporting shaft 119 at the positions distant from the respective ends of the supporting shaft 119 by a distance c each. Supporting rings 125 made of a resin material, for example, are inserted into the concave portions 119b. Reference numeral 121 depicts a cylindrical guide member. The supporting shaft 119 is engaged with the guide member 121 and the guide member 121 is supported by the supporting rings 125 of the supporting shaft 119. A reference numeral 124 depicts a ultrasonic vibrator and the front end face of the ultrasonic vibrator 124 is bonded, for example, to a predetermined position of the guide member 121.

Figure 11:
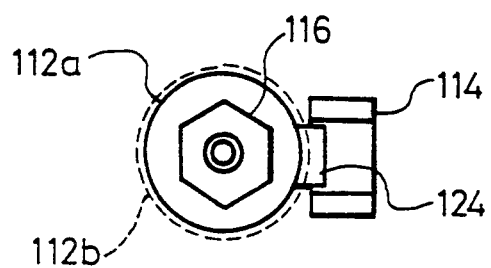
FIG. 11 is a top view illustrative of the main portion of the second embodiment of the tape guide apparatus according to the present invention.

The length of the guide member 121 is selected to be shorter than that of the supporting shaft 119 by 0.1 mm, for example. The guide member 121 supported to the supporting rings 125 of the supporting shaft 119 is inserted into the main shaft 111, and an upper flange 112a is inserted into the main shaft 111 to be located above the guide member 121. Further, as shown in FIG. 11, the upper and lower flanges 112a and 112b are made circular, respectively.

Furthermore, the screw portion 126 of the main shaft 111 and a height adjusting screw 116 are engaged and the upper flange 112a is pushed downwardly, that is, toward the base 123 side by rotating the height adjusting screw 116.

Figure 10:
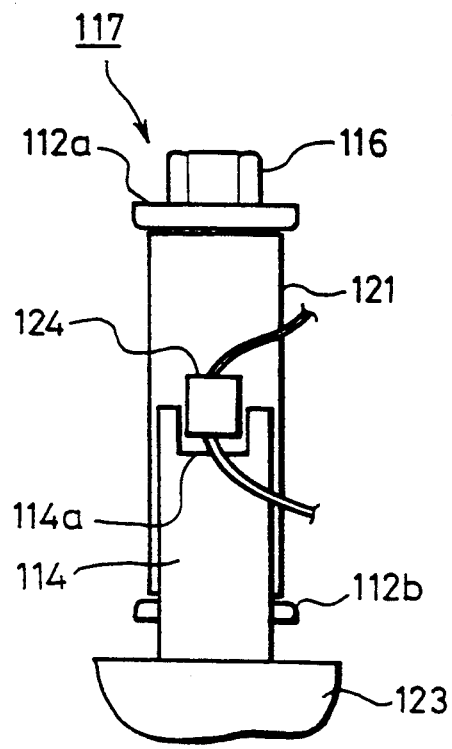
FIG. 10 is a side view illustrative of a main portion of the second embodiment of the tape guide apparatus according to the present invention.

As shown in FIG. 9, a rotation preventing member 114 and the base 123 are formed as one body. Also, as shown in FIG. 10, a concave portion 114a is formed on the upper portion of the rotation preventing member 114 and the ultrasonic vibrator 124 mounted on the guide member 121 is held by this concave portion 114a. At that time, the ultrasonic vibrator 124 is inserted into the concave portion 114a by about 3 mm, for example.

When the height adjusting screw 116 is rotated, then the height of the tape guide apparatus 117 can be adjusted by a spring-biasing force of the coil spring 127 or against the spring-biasing force of the coil spring 127. The height adjustable range is approximately 0.5 mm and the ultrasonic vibrator 124 is inserted into the concave portion 114a of the rotation preventing member 114 by about 3 mm as earlier noted so that, even when the height of the tape guide apparatus 117 is adjusted, then the ultrasonic vibrator 124 can be prevented from being disengaged from the rotation preventing member 114.

In the tape guide apparatus thus arranged, when an AC voltage of a resonance frequency of the guide member 121 is applied to the ultrasonic vibrator 124, a standing wave is generated in the guide member 121. As a consequence, when the tape transport is guided by the tape guide apparatus 117, a friction coefficient is reduced to a reciprocate of that provided when the AC voltage is not applied to the ultrasonic vibrator 124.

The state of the standing wave generated on the guide member 121 is represented as shown in FIG. 3, and the positions of the concave portions 119b in this embodiment are determined as the positions distant from the respective end faces of the guide member 121 by substantially the distance c, respectively, as shown in FIG. 9.

As clear from the above description, according to this embodiment, without using the mount member 8 of high accuracy shown in FIG. 1, the rotation preventing function of the guide member 21, which function should be exhibited by the above mount member 8, can be realized by the rotation preventing member 114 directly mounted on the base 123 so that the tape guide apparatus of this embodiment can be made compact in size and inexpensive.

According to the tape guide apparatus according to the second embodiment of the present invention, since the rotation preventing member for holding the ultrasonic vibrator is mounted on the base on which the supporting member is mounted, the number of assembly parts can be reduced to simplify the arrangement. There is then the advantage that the tape guide apparatus can be made compact in size and inexpensive.

Having described the preferred embodiments of the invention with reference to the accompanying drawings, it is to be understood that the invention is not limited to those of the precise embodiments and that various changes and modifications thereof could be effected by one skilled in the art without departing from the spirit or scope of the invention as defined in the appended claims.

I claim:

1. A tape guide apparatus having a cylindrical guide member for guiding a tape, an ultrasonic vibrator secured to said guide member for vibrating said guide member in a standing wave fashion and a supporting member for supporting said guide member, comprising;
   a main shaft inserted within said guide member;
   a ring-shaped protrusion provided on said main shaft for supporting said guide member at a position corresponding to a node portion of a standing wave vibration of said guide member; and a position restricting member provided on said main shaft for restricting the position of at least one end of said guide member; and wherein said main shaft has a groove into which said ring-shaped protrusion is inserted at its position corresponding to said node portion of said standing wave vibration of said guide member.

2. A tape guide apparatus according to claim 1, wherein said ring-shaped protrusion is made of a resin material.

3. A tape guide apparatus according to claim 1, wherein said position restricting member is formed of a nut member and said nut member is screwed into a screw portion formed on an end portion of said main shaft.

4. A tape guide apparatus according to claim 1, further comprising a base to which said supporting member is secured and said base is provided with a rotation preventing member for holding said ultrasonic vibrator in order to prevent said guide member from being rotated freely.

5. A tape guide apparatus having a cylindrical guide member for guiding a tape, an ultrasonic vibrator secured to said guide member for vibrating said guide member in a standing wave fashion and a supporting member for supporting said guide member, comprising;

a shaft whose diameter is sufficient to be inserted into the side of said guide member;

a ring-shaped member provided on said shaft independently of said shaft and for supporting said guide member at a position corresponding to a node portion of a standing wave vibration of said guide member;

a position restricting member provided on said shaft for restricting the position of at least one end of said guide member; and wherein said shaft has a groove into which said ring-shaped member is inserted at a position corresponding to said node portion of said standing wave vibration of said guide member.

6. A tape guide apparatus according to claim 5, wherein said ring-shaped member is made of a resin material.

7. A tape guide apparatus according to claim 5, wherein said position restricting member is formed of a nut member and said nut member is screwed into a screw portion formed on an end portion of said shaft.

8. A tape guide apparatus according to claim 5, further comprising a base to which said supporting member is secured and said base is provided with a rotation preventing member for holding said ultrasonic vibrator in order to prevent said guide member from being rotated freely.

* * * * *